US005749955A

United States Patent [19]

Shaked et al.

[11] Patent Number: 5,749,955
[45] Date of Patent: May 12, 1998

[54] CLAY ACTIVATION WITH METAL SALTS

[75] Inventors: Dov Shaked, Buffalo Grove, Ill.; Amos Banin, Rehovot, Israel; William F. Moll, Crystal Lake; Iwona M. Aguilar, Forest View, both of Ill.

[73] Assignee: Oil-Dri Corporation of America, Chicago, Ill.

[21] Appl. No.: 495,847

[22] Filed: Jun. 28, 1995

[51] Int. Cl.$^6$ .................................................. C04B 33/13
[52] U.S. Cl. ........................ 106/287.17; 501/146; 502/63; 502/73; 502/74; 502/80
[58] Field of Search ........................ 106/287.17; 501/146; 502/63, 73, 74, 80

[56] References Cited

U.S. PATENT DOCUMENTS

| 1,492,184 | 4/1924 | Wier et al. | |
|---|---|---|---|
| 2,671,058 | 3/1954 | Mickelson | 252/450 |
| 4,128,263 | 12/1978 | Traxer et al. | 501/146 |
| 4,781,864 | 11/1988 | Pryor et al. | 260/420 |
| 5,004,570 | 4/1991 | Brooks et al. | 260/427 |
| 5,248,641 | 9/1993 | Bauer et al. | 501/147 |

FOREIGN PATENT DOCUMENTS 270 058 A1   7/1989   Germany ........................ C01B 33/30

OTHER PUBLICATIONS

Sanchez, et al., *J. Molecular Catalysis* 92: 311–324 (1994). no month avail.

March, J., *Advanced Organic Chemistry: Reactions, Mechanisms and Structure*, 4th ed., Wiley, New York, pp. 248–263 (1992). no month avail.

van Olphen, H., *Clay Colloid Chemistry*, Wiley, New York, pp. 190–193 (1977). no month avail.

van Santen, R.A., et al., The hydroisomerization acidity of nickel–substituted mica montmorillonite clay, pp. 275–291 in Grasselli et al., eds. *Solid State Chemistry in Catalysis*, American Chemical Society, Washington, D.C. (1985). no month avail.

Xu, S. et al., *Clay and Clay Minerals* 40:567–574 (1992). no month avail.

*Primary Examiner*—David Brunsman
*Attorney, Agent, or Firm*—Olson & Hierl, Ltd.

[57] ABSTRACT

High performance activated clays suitable for bleaching oil are produced by mixing a clay mineral with a metal salt that is a Lewis acid. Mixtures of such metal salts can be used as well.

17 Claims, 3 Drawing Sheets

CLAY ACTIVATION WITH METAL SALTS

TECHNICAL FIELD

This invention relates to clay-based compositions suitable for the bleaching of oil. In particular, the present invention is directed to oil bleaching compositions treated with a multivalent metal salt that is a Lewis acid.

BACKGROUND OF THE INVENTION

Fats and fatty oils, commonly called triglycerides, are constituted of triesters of glycerol, and include minor amounts of fatty acids. At ambient temperatures, about 20 degrees C. to about 25 degrees C., fats are solids, whereas fatty oils are liquids.

Triglycerides are widely distributed in nature. Some triglycerides are edible while others are not. Many are derived directly from vegetable, animal, and marine sources. Others are obtained, as by-products, in the production of fiber from vegetable matter, and in the production of protein from vegetable, animal or marine matter.

Edible vegetable oils include canola, coconut, corn germ, cottonseed, olive, palm, peanut, rapeseed, safflower, sesame seed, soybean, and sunflower oils. Examples of nonedible vegetable oils are jojoba oil, linseed oil and castor oil.

Illustrative sources of edible animal-derived oil include lard and tallow. Examples of nonedible animal-derived oil are low grade tallow and neat's-foot oils.

Some of these oils may have a color that is objectionable to a consumer. Thus, the oil needs to be bleached to improve its color quality. To this end, a great many oils are commonly treated with bleaching clays to reduce oil color values by adsorptive purification. Bleaching clays generally improve oil color quality by adsorbing color impurities that are present. Color impurities typically present in oils include, for example, carotenoids, xanthophylls, xanthophyll esters, chlorophyll, tocopherols, as well as oxidized fatty acids and fatty acid polymers.

It is also desirable to remove color impurities from a nonedible oil to obtain a acceptable color.

Natural clays, e.g., Fuller's earth and the bentonites, have commonly been used as bleaching clays to remove both the naturally-occurring and the otherwise-present, e.g., the thermally-induced, color impurities from edible and nonedible oils. It has been suggested that clays containing a zeolite can be used for such a purpose as well.

Acid-activated clays have also been used for this purpose. Such clays generally remove a relatively wider spectrum of color impurities.

However, addition of an inorganic acid, such as sulfuric acid, to clay has an adverse effect on the clay lattice. The acid tends to cause degradation of the lattice with attendant product stability problems.

Shelf life also can be a major problem with all commercially available bleaching clays. Significant degradation in product bleaching activity may occur initially after manufacturing. Degradation rate declines with time, but still continues.

A conventional process for producing acid-activated bleaching clays utilizes calcium bentonite clays and sulfuric acid. The calcium bentonites used in the acid activation process typically are neutral to mildly basic. The acidic salts formed during activation and residual acid can be washed off and separated by filtration from the product clay, if desired. However it is not necessary to do so.

Another type of naturally-occurring clay, frequently classified as palygorskite clays, requires heat to impart bleaching activity. Mineralogically, the palygorskite clays are distinguishable from the bentonites (smectites, including montmorillonites).

SUMMARY OF THE INVENTION

Highly active clay-derived bleaching compositions are obtained by the activation of a clay mineral by metal salts that are Lewis acids. Activation in this manner can be effected at ambient temperatures, and in a relatively short time period of the order of minutes. After activation, the obtained product is air dried, size reduced and classified if desired, and is then ready for use.

Surface acidity, along with surface area, pore size distribution and pore volume, is an important clay characteristic affecting the ability of a clay to remove chlorophyll from oils. Cations of aluminum, iron and titanium, which coat the surface of the some clays, are major factors that enhance the clays, ability to remove pigments such as chlorophyll from oils. The addition of such Lewis acid metal salts to the raw clay enhances the clay's ability to remove pigments from oils by increasing the amount of available surface acid sites present and improves the stability of the enhanced clay as well.

DESCRIPTION OF THE EMBODIMENTS

While this invention is susceptible to embodiments in many different forms, preferred embodiments of the invention are described below. It should be understood, however, that the present disclosure is to be considered as a exemplification of the principles of the invention and is not intended to limit the invention to the specific embodiments illustrated.

The compositions of the present invention are clays that are activated by metal salts that are Lewis acids and are useful for reducing the amount of color impurities in an oil.

Throughout this application, the term "oil," and the grammatical variations thereof, includes vegetable-derived, animal-derived as well as marine source-derived fats and fatty oils that are liquids at the particular temperature that is necessary for desired processing of a particular type of oil.

In use, the oil and the present oil bleaching composition are combined in a suitable vessel to produce a slurry. The resulting slurry is maintained at an elevated temperature and at a pressure no greater than about atmospheric pressure for a time period sufficient to reduce the amount of color impurities of the oil without causing degradation of the oil, i.e., the oil is bleached substantially without thermal decomposition of the oil. A bleached oil is then recovered from the slurry.

The bleaching is performed at a temperature elevated above room temperature, i.e., at about 30 degrees C. and higher, but below the temperature that induces thermal decomposition of the oil. A preferred bleaching temperature is in a range of about 50 degrees to about 130 degrees C., more preferably about 60 degrees to about 125 degrees C.

The pressure at which the bleaching is performed can be atmospheric or less than atmospheric (subatmospheric), as desired. A suitable reduced pressure is in a range of 1 to about 26 inches of mercury. A preferred reduced pressure is in a range of about 1 to about 5 inches of mercury. A most preferred reduced pressure is about 4 inches of mercury.

The time period sufficient to reduce the amount of color impurities in the oil utilizing the present bleaching compositions usually is in a range of about 5 to about 90 minutes.

Oils that can be bleached using the composition of the present invention include both edible and inedible oils. Illustrative oils are those previously mentioned hereinabove.

Materials suitable for the activating treatment of the present invention are clays, i.e., those clay materials characterized by a mineral structure formed by the arrangement of octahedral units and tetrahedral units or by stacked layers formed by an octahedral sheet and one or more tetrahedral sheets of the atoms that constitute the clay mineral structure. Illustrative are the two groups of naturally occurring clay minerals. First is the hormite group, defined here as including palygorskite and sepiolite, which have channels formed by octahedral units and tetrahedral units of the clay mineral structure. Second is the smectite group including montmorillonites and saponite, which are constituted by stacked layers formed by an octahedral sheet and one or more tetrahedral sheets, and mixtures of the foregoing. Previously acid activated bleaching clays, such as those commercially available, e.g., FILTROL® 105 SF, PURE-FLO® Supreme, and the like, are also suitable. As to the latter grouping of clay minerals, the bleaching activity of these acid activated bleaching clays (usually acid-treated calcium bentonites) can be further enhanced by the treatment provided by the process of the present invention.

Palygorskite (attapulgite), a mineral found in some clays, is a hydrous silicate material represented by the approximate formula:

$(OH_2)_4(OH)_2Mg_5Si_8O_{20}\cdot 4H_2O$.

See, e.g., Grim, R. E., *Clay Mineralogy*, 2nd ed., McGraw-Hill, Inc., New York, N.Y. (1968), p. 115.

Smectite is a generic term that refers to a variety of related minerals also found in some clays. The smectite minerals typically occur only as extremely small particles. Generally, smectite is composed of units made of two silica tetrahedral sheets with a central alumina octahedral sheet. Each of the tetrahedra has a tip that points to the center of the smectite unit. The tetrahedral and octahedral sheets are combined so that the tips of the tetrahedra of each silica sheet and one of the hydroxyl layers of the octahedral sheet form a common layer. See *Id.*, pp. 77–78.

In particular, the smectite family of clays includes the various mineral species montmorillonite, nontronite, hectorite and saponite, all of which can be present in the clay mineral in varying amounts.

Other minerals, neither of the smectite genus nor of the hormite variety, that can be present in clay include opal, apatite, calcite, the feldspars, kaolinite, mica, quartz and gypsum, among others.

It has been found that addition of certain metal salts to clay, with or without the addition of sulfuric acid, enhances the surface acidity of the clay without a substantial adverse effect on the clay lattice.

The amount of available surface acid sites is enhanced by introducing cations of high charge and small radius, such as $Al^{3+}$, $Fe^{2+}$, $Fe^{3+}$, or $Ti^{4+}$ that react with water to make a proton available for further reaction. Metal salts that are Lewis acids are suitable sources of such cations. Optionally, additional protons can be provided by means of a protonic acid treatment using, e.g., sulfuric acid. The combination of both introducing cations of high charge and small radius and providing protons by means of a protonic acid is preferred. Particularly preferred is the addition of $Al_2(SO_4)_3$ with relatively small amounts of $H_2SO_4$.

The metal salts that are Lewis acids can be combined with the clay material in any convenient manner such as by blending a moist clay with a dry, granular Lewis acid, by mixing with an aqueous solution of a Lewis acid, or the like. Thereafter the resulting product is preferably dried to a free moisture (FM) content of no more than about 35 weight percent, more preferably to a free moisture content of no more than about 20 weight percent, and most preferably to a free moisture content of no more than about 10 weight percent, based on the weight of the product.

The charge and the radius of the ion relates to the ionic potential of an ion. Mason, B., *Principles of Geochemistry* 2d, 155, Wiley and Sons, New York (1958). Ionic potential is the charge of the ion (Z) divided by the radius of the ion (r), and is, in effect, a measure of electronegativity. *Id.*, 155–56. Ionic potentials of several ions are given in Table 1. *Id.*, 156. Cations having ionic potentials in the range of about 2.5 to about 10 are preferred and are provided by the preferred Lewis acid metal salts of the present invention, i.e., aluminum salts such as aluminum chloride, aluminum sulfate, and the like, iron salts such as ferric sulfate, ferrous sulfate, and the like, as well as titanium salts such as titanium sulfate and the like.

TABLE 1

| Ionic Potentials | | | |
|---|---|---|---|
| $Cs^+$ | 0.60 | $Th^{4+}$ | 3.9 |
| $Rb^+$ | 0.68 | $Ce^{4+}$ | 4.3 |
| $K^+$ | 0.75 | $Fe^{3+}$ | 4.7 |
| $Na^+$ | 1.0 | $Zr^{4+}$ | 5.1 |
| $Li^+$ | 1.5 | $Be^{2+}$ | 5.7 |
| $Ba^+$ | 1.5 | $Al^{3+}$ | 5.9 |
| $Sr^{2+}$ | 1.8 | $Ti^{4+}$ | 5.9 |
| $Ca^{2+}$ | 2.0 | $Mn^{4+}$ | 6.7 |
| $Mn^{2+}$ | 2.5 | $Nb^{5+}$ | 7.5 |
| $La^{2+}$ | 2.6 | $Si^{4+}$ | 9.5 |
| $Fe^{2+}$ | 2.7 | $Mo^{5+}$ | 9.7 |
| $Co^{2+}$ | 2.8 | $B^{3+}$ | 13 |
| $Mg^{2+}$ | 3.0 | $P^{5+}$ | 14 |
| $Y^{3+}$ | 3.3 | $S^{6+}$ | 20 |
| $Lu^{3+}$ | 3.5 | $C^{4+}$ | 25 |
| $Sc^{3+}$ | 3.7 | $N^{5+}$ | 38 |

For bleaching an oil, the amount of the present bleaching clay that is combined with the oil to be bleached usually is in the range of about 1 to about 5 weight percent, based on the weight of the oil. Lesser or greater amounts can be used, depending upon the oil to be treated and the severity of the desired bleaching treatment.

The acid site enhancement process embodying the present invention can be carried out batchwise, or as a continuous process, as convenient. The mixing of the clay and multivalent metal salts, with or without the presence of a protonic acid, during the activation process can be readily achieved by the use of a static mixer, a commercially available blender, or the like expedient. The amount of the multivalent metal ion present is sufficient to enhance the amount of surface acid sites present and usually is in the range of about 0.2 to about 0.5 weight percent for Al and about 0.2 to about 0.6 weight percent for Fe, expressed as weight of the metal and based on the weight of the dry clay.

The present invention is illustrated by the following examples.

EXAMPLE 1

Enhancement of Bleaching by Treatment of Georgia Clays with Lewis Acids or Lewis Acid Metal Salts Georgia clay, when mixed in the moist state with dry, granular Lewis acids or solutions of Lewis acids, and after an appropriate drying and grinding, produced a bleaching clay exhibiting more bleaching activity than a bleaching clay made by the sulfuric acid treatment alone.

Surface acidity in bleaching clays is controlled by the chemistry and amount of multivalent cations (such as $Ti^{4+}$, $Al^{3+}$, $Fe^{2+}$) exposed or covering the clay surface. By mixing the Georgia clay with 4 to 5 weight percent sulfuric acid, the amount of those extractable metals was doubled.

A highly active also bleaching clay resulted from mixing clay with solutions of $Al_2(SO_4)_3$ and $FeSO_4$ salts at a ratio of the metals of 4:2 by weight. Small amounts of titanium sulfate added to the mixture provided further improvement in bleaching characteristics. The Lewis acid metal salt treated clay of this invention performed better in chlorophyll removal than a sulfuric acid enhanced clay made from the same starting raw material.

The Lewis acid treated bleaching clay showed better stability than the commercially available bleaching clay (PURE-FLO SUPREME) used for these comparisons. The commercially available bleaching clay used for comparison in this instance was made from a mixture of a high pH (pH value of 7 to 8) clay that is acid activated with 4 to 6 weight percent of sulfuric acid.

Sample Preparation

Each raw clay sample was ground to less than 3 mm in largest dimension by a laboratory hammer mill. An aliquot (1500 g) of clay was mixed with various Lewis acid metal salts separately and in combination to yield the optimal activity. Tables 2 and 3 give the ratios and weight percentages of the added metal salts. For comparison, clays were also treated with 4, 5, and 6 weight percent sulfuric acid. After mixing, the samples were dried in an oven to 12 weight percent free moisture (FM). Dried samples were ground to powder by a micropulverizer.

The hydrated salts $Al_2(SO_4)_3 \cdot 18\ H_2O$, $FeSO_4 \cdot 7\ H_2O$, and $TiSO_4 \cdot 8\ H_2O$ were used. Aluminum sulfate was generally used as a 26.8 weight percent solution. Appropriate amounts of Fe or Ti salts were dissolve in water to produce solutions added at the proportion of 100 ml solution to 1500 g of raw clay. The added amounts are reported as weight percent of the cation based on dry clay (zero weight percent moisture).

Each sample was tested for bleaching activity with canola oil. Canola oil (100 g) containing chlorophyll (26,000 ppb) was combined with the indicated weight percent of clay and bleached at 108 degrees C. for 30 minutes under partial vacuum of 26 inches of mercury (0.87 atmosphere). The remaining chlorophyll, red colors, free fatty acid (FFA) and peroxide values (PV) in the bleached oils were measured using standard tests.

The red color of the treated oil was monitored in accordance with American Oil Chemists Society (AOCS) Official Method CC13b-45, and light absorption at 450 nanometers (nm). All clay samples were tested for free moisture and pH. Aluminum and iron concentrations were measured in some selected oil samples. Stability testing on some selected samples was done by running bleaching tests on aged clay.

Table 2 compares the effects on bleaching activity of two treatments: enhancement using Lewis acid metal salts and $H_2SO_4$ enhancement. The results show that the Lewis acid enhanced product of the present invention has a significantly higher pH, removes chlorophyll better, removes soaps equally well, and has slightly lower FFA compared to the $H_2SO_4$ enhanced product. Treatment with both 0.32% Al and 1% $H_2SO_4$ was more effective than treatment with $H_2SO_4$ but not as effective as treatment with 0.32% Al alone.

The combination of aluminum and iron sulfates gave better chlorophyll removal than either of the individual sulfates alone. Clay treated with aluminum sulfate performed better than clay treated with an equivalent weight percent of aluminum chloride.

TABLE 2

Enhancement of Bleaching Activity after Various Clay Treatments (Starting Chlorophyll Concentration 26,000 ppb)

| | % Added (weight % of clay) | Remaining Chlorophyll (ppb) Mean | StDev | pH | Soap Removed (ppm) | FFA (%) |
|---|---|---|---|---|---|---|
| $Al_2(SO_4)_3$ | 0.08 Al | 2441 | 7.1 | 5.13 | 6.09 | 0.050 |
| | 0.24 Al | 1752 | 62.9 | 4.45 | 6.10 | 0.045 |
| | 0.32 Al | 1663 | 0.0 | 4.34 | 6.08 | 0.050 |
| | 0.40 Al | 1720 | 87.0 | 4.12 | 7.61 | 0.050 |
| | 0.48 Al | 1730 | 58.7 | 5.12 | 7.61 | 0.065 |
| | 0.54 Al | 1727 | 173.9 | 4.05 | 10.65 | 0.060 |
| $Al_2(SO_4)_3$ + $FeSO_4$ | 0.32 Al 0.2 Fe | 1415 | 21.1 | 4.03 | 7.61 | 0.050 |
| | 0.16 Al 0.4 Fe | 1835 | 83.4 | 4.05 | 7.35 | 0.050 |
| | 0.24 Al 0.2 Fe | 1666 | 24.0 | 4.14 | | 0.060 |
| | 0.24 Al 0.4 Fe | 1850 | 173.9 | 4.02 | 9.13 | |
| $FeSO_4$ | 0.8 Fe | 1804 | 79.9 | 3.95 | | |
| $H_2SO_4$ | 4 | 2234 | 97.9 | 2.84 | 6.09 | 0.065 |
| | 5 | 2136 | 159.8 | 2.57 | 7.61 | 0.065 |
| $AlCl_3$ | 0.81 Al | 2935 | 107.5 | 4.00 | | |
| | 1.01 Al | 2412 | 70.0 | 4.01 | | |
| | 1.21 Al | 2197 | 59.4 | 3.83 | | |
| $Al_2(SO_4)_3$ + $H_2SO_4$ | 0.32 Al 1 $H_2SO_4$ | 1991 | 72.8 | 3.16 | | |

EXAMPLE 2

Effect of Lewis Acid Concentration on Enhancement of Bleaching

Further studies examined the effects of adding different concentrations and combinations of Al and Fe. The results are presented in Table 3. One of the more effective treatments was the addition of a combination of salts containing 0.32% Al and 0.4% Fe. The added cation concentration is expressed as based weight percent of dry clay. There was 30-40% less chlorophyll remaining after bleaching with clay subjected to this treatment compared to clay treated with $H_2SO_4$. The results of measuring the pH and FFA values were similar to those reported in Example 1. In all tests, Fe remaining in the bleached canola oil was below the detection limit (<0.1 ppm).

TABLE 3

Optimization of Clay Treatment

| % Added (weight % of clay) | Remaining Chlorophyll (ppb) Mean | StDev | pH | FFA (%) | Free Moisture (FM, %) |
|---|---|---|---|---|---|
| $Al_2(SO_4)_3$ 0.24 Al | 2165 | 83.4 | 4.11 | 0.040 | 9.4 |
| 0.32 Al | 1772 | 13.4 | 3.92 | 0.050 | 9.8 |
| $Al_2(SO_4)_3$ + $FeSO_4$ 0.24 Al 0.2 Fe | 1838 | 38.2 | 3.95 | | 5.6 |
| 0.32 Al 0.2 Fe | 1765 | 79.9 | 3.91 | | 7.6 |
| 0.40 Al 0.2 Fe | 1784 | 10.6 | 3.83 | | 9 |
| 0.24 Al 0.4 Fe | 1635 | 40.3 | 3.87 | 0.055 | 7.4 |
| 0.32 Al 0.4 Fe | 1502 | 40.3 | 3.80 | 0.060 | 13.4 |
| 0.40 Al 0.4 Fe | 1644 | 13.4 | 3.64 | 0.055 | 10.8 |
| $H_2S_4$ 4 | 2240 | 61.5 | 2.92 | 0.065 | 7.6 |
| 5 | 2276 | 52.3 | 2.66 | | 10.4 |
| 6 | 2520 | 77.1 | 2.47 | | 6.8 |

EXAMPLE 3

Effect of Lewis Acid Concentration on Enhancement of Bleaching, Raw Clay Source B The performance of a different clay treated with combinations of $Al_2(SO_4)_3 \cdot 18\ H_2O$ and $FeSO_4 \cdot 7\ H_2O$ was examined. The results, reported below in Table 4, confirm that Lewis acid treatment produces better results than $H_2SO_4$ treatment, and that 4% $Al_2(SO_4)_3 \cdot 18\ H_2O$ and 2% $FeSO_4 \cdot 7\ H_2O$ is the preferred combination of aluminum and iron sulfates to be added. This combination corresponds to an addition of 0.32% Al and 0.4% Fe, the cation concentration being expressed as weight percent of dry clay.

TABLE 4

Optimization of Al and Fe Addition

| % Added (weight %) of clay | Remaining Chlorophyll (ppb) Mean | StDev | Red Color (Absorption at 450 nm) |
|---|---|---|---|
| $Al_2(SO_4)_3$ + $FeSO_4$ 0.24 Al 0.3 Fe | 1580 | 21 | 0.9625 |
| 0.24 Al 0.4 Fe | 1575 | 63 | 0.9765 |
| 0.24 Al 0.5 Fe | 1675 | 24 | 0.9945 |
| 0.32 Al 0.3 Fe | 1668 | 14 | 0.9540 |
| 0.32 Al 0.4 Fe | 1489 | 52 | 0.9455 |
| 0.32 Al 0.5 Fe | 1575 | 42 | 0.9655 |
| 0.40 Al 0.3 Fe | 1661 | 143 | 0.9460 |
| 0.40 Al 0.4 Fe | 1562 | 38 | 0.9775 |
| 0.40 Al 0.5 Fe | 1831 | 21 | 1.0475 |
| $H_2SO_4$ 4 | 2169 | 42 | 0.8845 |
| 5 | 2042 | 188 | 0.8610 |
| 6 | 2315 | 86 | 0.9145 |

Table 5 shows the results of additions of Al and Fe cations, in combination with $H_2So_4$, in comparison with the effects of the addition of either of these cations alone. The average of two chlorophyll determinations is presented with the standard deviation (StDev). The additive combination that produced the lowest remaining chlorophyll levels of the Lewis acid metal salts treatments was observed to be that of 0.32% Al and 0.4% Fe together with 2% $H_2SO_4$.

TABLE 5

Georgia Clay Enhanced with Al, Fe and $H_2SO_4$

| Al wt. % | $H_2SO_4$ wt. % | Fe wt. % | Remaining Chlorophyll (ppb) | Remaining Chlorophyll Average ± StDev (ppb) | Red Color | pH |
|---|---|---|---|---|---|---|
| 0.32 | 2 | 0.2 | 1363 1447 | 1406 ± 59 | 6.7 6.7 | 3.2 |
| 0.32 | 2 | 0.4 | 1299 1225 | 1262 ± 52 | 6.5 6.4 | 3.09 |
| 0.32 | 1 | 0.4 | 1556 1575 | 1565 ± 14 | 6.6 6.5 | 3.46 |
| 0.32 | 3 | 0.4 | 1732 1633 | 1682.5 ± 70 | 6.9 6.7 | 2.83 |
| — | 5 | — | 1884 1732 | 1808 ± 107 | 6.5 6.4 | 2.82 |
| 0.32 | 2 | — | 1756 1629 | 1692.5 ± 90 | 6.9 6.6 | 3.22 |
| 0.32 | — | 0.4 | 1462 1457 | 1459.5 ± 4 | 7.3 7.2 | 4.0 |
| 0.32 | 1 | — | 1693 1639 | 1666 ± 38 | 7.5 7.4 | 3.56 |

EXAMPLE 4

Effect of Lewis Acid Concentration on Enhancement of Bleaching

The effect of $Ti(SO_4)_2 \cdot 8\ H_2O$ in combination with the preceding aluminum and iron sulfate treatments was examined. The results are shown in Tables 6, 7 and 8, below. The presence of $Ti^{4+}$, added as $Ti(SO_4)_2 \cdot 8\ H_2O$, in addition to aluminum sulfate and iron sulfate further enhanced the bleaching performance of the treated clays. The slight differences in efficiency reflect variability in raw materials and analytical precision.

TABLE 6

Effect of Al, Fe, and Ti Sulfate Treatment on Bleaching Efficiency of Clay

| | wt. % Added | Remaining Chlorophyll (ppb) Mean | StDev |
|---|---|---|---|
| $Al_2(SO_4)_3$ + $FeSO_4$ + $TiSO_4$ | 0.32 Al 0.4 Fe 0 Ti | 2118 | 190.9 |
| | 0.32 Al 0.4 Fe 0.068 Ti | 1968 | 41.7 |
| | 0.32 Al 0.4 Fe 0.125 Ti | 1897 | 31.1 |
| $H_2SO_4$ | 5 | 2234 | 55.9 |

TABLE 7

Effect of Various Concentrations of Titanium on Bleaching Efficacy: Study A

| Sample | wt. % Added $H_2SO_4$ | Al | Fe | Ti | pH | Remaining Chlorophyll (ppb) Mean | StDev |
|---|---|---|---|---|---|---|---|
| 1  |   | 0.24 | 0.4 | 0.063 | 3.95 | 1415 | 17  |
| 2  |   | 0.24 | 0.4 | 0.125 | 3.89 | 1309 | 7   |
| 3  |   | 0.24 | 0.4 | 0.188 | 3.81 | 1536 | 13  |
| 4  |   | 0.28 | 0.4 | 0.063 | 3.89 | 1267 | 38  |
| 5  |   | 0.28 | 0.4 | 0.125 | 3.88 | 1167 | 56  |
| 6  |   | 0.28 | 0.4 | 0.188 | 3.82 | 1282 | 17  |
| 7  |   | 0.32 | 0.4 | 6.063 | 3.85 | 1275 | 13  |
| 8  |   | 0.32 | 0.4 | 0.125 | 3.78 | 1375 | 38  |
| 9  |   | 0.32 | 0.4 | 0.188 | 3.76 | 1804 | 18  |
| 10 | 4 | — | — | — | 3.23 | 1841 | 180 |
| 11 | 5 | — | — | — | 2.98 | 1727 | 1   |

TABLE 8

Effect of Various Concentrations of Titanium on Bleaching Efficacy: Study B

| Sample | wt. % Added $H_2SO_4$ | Al | Fe | Ti | pH | Remaining Chlorophyll (ppb) Mean | StDev |
|---|---|---|---|---|---|---|---|
| 1  |   | 0.24 | 0.4 | 0.063 | 3.78 | 1378 | 62  |
| 2  |   | 0.24 | 0.4 | 0.125 | 3.80 | 1378 | 7   |
| 3  |   | 0.24 | 0.4 | 0.188 | 3.57 | 1265 | 7   |
| 4  |   | 0.28 | 0.4 | 0.063 | 3.95 | 1346 | 66  |
| 5  |   | 0.28 | 0.4 | 0.125 | 3.82 | 1464 | 45  |
| 6  |   | 0.28 | 0.4 | 0.188 | 3.58 | 1550 | 188 |
| 7  |   | 0.32 | 0.4 | 0.063 | 3.92 | 1385 | 18  |
| 8  |   | 0.32 | 0.4 | 0.125 | 3.66 | 1380 | 66  |
| 9  |   | 0.32 | 0.4 | 0.188 | 3.55 | 1329 | 91  |
| 10 |   | 0.32 | 0.4 | — | 4.06 | 1419 | 80  |
| 11 | 5 | — | — | — | 2.81 | 1796 | 8   |

TABLE 9

Effect of Clay Source and Lewis Acid Concentration on Bleaching Efficacy

| Raw Clay Source | wt. % Added | Remaining Chlorophyll (ppb) Mean | StDev |
|---|---|---|---|
| A | 0.32 Al 0.4 Fe | 1569 | 34  |
| B | 0.32 Al 0.4 Fe | 1335 | 1   |
| C | 0.32 Al 0.4 Fe | 4643 | 316 |
| D | 0.32 Al 0.4 Fe | 1975 | 24  |
| E | 0.32 Al 0.4 Fe | 2237 | 114 |
| F | 0.32 Al 0.4 Fe | 1838 | 190 |

EXAMPLE 5

Effect of Clay Source and Lewis Acid Concentration on Enhancement of Bleaching

Clays from several raw material sources were studied as candidates for activation by Lewis acids.

The results, shown in Table 9 (above), indicate that the bleaching enhancement achieved varies with the starting clay material.

EXAMPLE 6

The Effect of Lewis Acid Metal Salts Treatment on Surface Area and Pore Volume

Treatment with Lewis acid metal salts alters physical characteristics of the clay surface such as clay specific surface area and pore volume.

The changes in clay surface area and pore volume were measured by two techniques: the well-known BET method described in Brunnauer et al., *J. Am. Chem. Soc.* 60: 309 (1938) and the ethylene glycol monoethyl ether (EGME) method. See generally, Bradley, et al., *Clays and Clay Min.* 10: 117–122 (1961); Brindley, G. W. and Hoffmann, R. W., *Clays and Clay Min.* 9: 546–556 (1960); Carter, et al., *Soil Sci.* 100: 356–360 (1965); Ratner-Zohar, et al., *Soil Science Society of America Journal* 47: 1056–1057 (1983).

Table 10 shows the results measured by the BET method for Georgia clay treated with various dosages of sulfuric acid. Surface area, pore volume and the total volume of pores in the range of 2–10 nm all declined with increased acid dosage. In contrast, pore diameter increased with increased acid dosage.

TABLE 10

Effect of Acid Added to Clay Structure on Pore Size and Pore Volume

| $H_2SO_4$ % | Surface Area (BET) $m^2/g$ | Total Pore Volume ml/g | Average Pore Diameter, nm | Pore Volume in the range of 2–10 nm, ml/g |
|---|---|---|---|---|
| 0  | 134   | 0.489 | 14.6 | 0.78  |
| 1  | 135.6 | 0.497 | 14.2 | 0.188 |
| 3  | 126.3 | 0.457 | 14.5 | 0.173 |
| 5  | 104.1 | 0.415 | 15.9 | 0.168 |
| 10 | 68    | 0.351 | 20.7 | 0.144 |

The results of measuring surface area by the EGME method for clays treated with various combinations of metal salts are presented in Table 11. The same clay sample was used as the raw material source to simplify comparisons. The average surface area for the metal salt treated clay (500 $m^2/g$) was higher than that of the sulfuric acid treated clay (386 $m^2/g$).

TABLE 11

Surface Area Measured by EGME

| Metal Added, as Sulfate | Percent Metal Added | SSA $m^2/g$ |
|---|---|---|
| Al, Fe   | 0.32, 0.40 | 511 |
| Al, Fe   | 0.24, 0.40 | 509 |
| Al, Fe   | 0.40, 0.20 | 496 |
| Al, Fe   | 0.28, 0.40 | 505 |
| $H_2SO_4$ | 5         | 386 |

Figure 1:
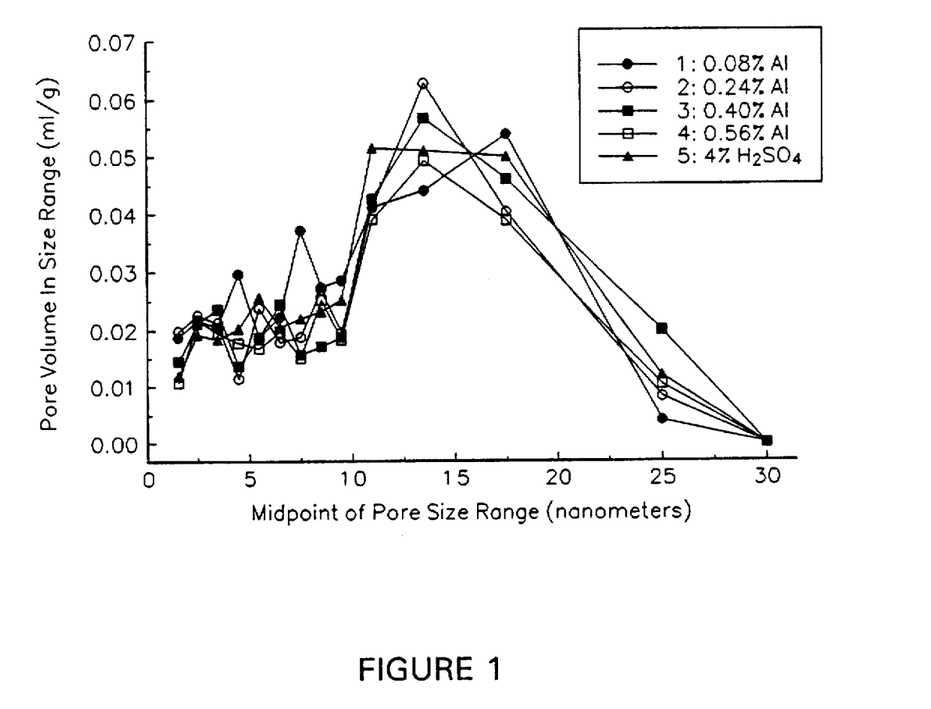
FIG. 1 shows the distribution of pore volumes within pore size classes produced by treatment with Lewis acid metal salts compared to treatment with sulfuric acid.

Comparable results using the BET method are provided in Table 12. The changes in the distribution of pore sizes is shown graphically in FIG. 1. Little change in surface area and average pore diameter was noted with the relatively lower dosages of Al. However, the highest Al dosage produced changes similar to those produced by sulfuric acid treatment.

TABLE 12

Surface Area Results, Clay Treated With Various Concentrations in Weight Percent of Al Salt

| SAMPLE | 0.08% Al | 0.24% Al | 0.40% Al | 0.56% Al | 4% $H_2SO_4$ |
|---|---|---|---|---|---|
| BET ($m^2/g$) | 145.5 | 151.4 | 145.2 | 123.5 | 129.8 |
| Total Pore Volume (ml/g) | 0.4387 | 0.4423 | 0.4020 | 0.3600 | 0.4104 |
| Average Pore Diameter (nm) | 12.1 | 11.7 | 11.1 | 11.6 | 12.6 |
| Pore Volume (ml/g) In Pore Size Ranges | | | | | |
| 1–2 nm | 0.01877 | 0.01983 | 0.01452 | 0.01069 | 0.01195 |
| 2–3 | 0.02178 | 0.02260 | 0.02116 | 0.02180 | 0.01930 |
| 3–4 | 0.02049 | 0.02132 | 0.02359 | 0.01958 | 0.01844 |
| 4–5 | 0.02969 | 0.01140 | 0.01367 | 0.01779 | 0.02029 |
| 5–6 | 0.01881 | 0.02382 | 0.01878 | 0.01678 | 0.02569 |
| 6–7 | 0.02229 | 0.01789 | 0.02445 | 0.01978 | 0.02054 |
| 7–8 | 0.03718 | 0.01881 | 0.01565 | 0.01510 | 0.02197 |
| 8–9 | 0.02742 | 0.02700 | 0.01716 | 0.02521 | 0.02324 |
| 9–10 | 0.02858 | 0.01963 | 0.01876 | 0.01831 | 0.02522 |
| 10–12 | 0.04119 | 0.04116 | 0.04259 | 0.03909 | 0.05152 |
| 12–15 | 6.04407 | 0.06281 | 0.05681 | 0.04928 | 0.05150 |
| 15–20 | 0.05396 | 0.04043 | 0.04605 | 0.03894 | 0.05000 |
| 20–30 | 0.00403 | 0.00824 | 0.01992 | 0.01037 | 0.01191 |
| >30 | 0.00000 | 0.00000 | 0.00000 | 0.00000 | 0.00000 |

The physical characteristics of clays activated by treatment with Lewis acids made in this Example are compared to the two commercially available clays in Table 13. The Lewis acid enhanced product shows a 20% improvement in chlorophyll removal compared with $H_2SO_4$ enhanced material from the same homogeneous stockpile.

Variations in measured parameters probably resulted from inconsistent manual addition of the Lewis acids in this case. Variations were especially noticeable at low product dosages.

Pore volume measurements are presented in Table 13. The fraction of pores in the 2–10 nm size range, believed to have greatest effect on chlorophyll removal, are highest in the metal salt enhanced material. In this critical pore size range, the Lewis acid enhanced clay had 15% more pore volume than the $H_2SO_4$ enhanced clay.

Filtration rates measured using the Lewis acid activated clay of the present invention were similar to those of the commercially available bleaching clay, PURE-FLO SUPREME.

TABLE 13

| Clay | pH | FM (%) | FFA (%) | PV (meq/kg) | Surface Area ($m^2/g$) | Total Pore Volume (ml/g) | Average Pore Diameter (nm) | Pore Volume 2–10 nm (ml/g) |
|---|---|---|---|---|---|---|---|---|
| Al + Fe Treated (Mean, N = 5) | 3.96 | 13.7 | 0.05 | 2.96 | 137.8 | 0.313 | 9.07 | 0.16 |
| Pure-Flo Supreme Pro-Active[1] | 3.07 | 14.4 | 0.055 | 2.9 | 141.2 | 0.299 | 8.49 | 0.146 |
| Optimum FF[2] | 3.22 | 8.6 | 0.055 | 3.0 | 214 | 0.3 | 5.61 | 0.141 |

[1]$H_2SO_4$ — enhanced bleaching clay
[2]Bleaching clay commercially available from Süd Chemie.

EXAMPLE 7

Comparison of Physical Characteristics: Clays Produced on Industrial Scale

Clays activated by treatment with Lewis acid metal salts were produced using pug mill, rotary dryer, and a Raymond roller mill. The ferrous sulfate heptahydrate was added as a dry powder to the conveyor. Aluminum sulfate solution was sprayed onto the clay in the pug mill. The target moisture was 17% and the grind was 80% −325 mesh. The target addition of the chemical was 0.4 wt.-% Fe and sufficient aluminum sulfate solution to yield 0.32 wt.-% Al. The manual addition of ferrous sulfate and aluminum sulfate produced some variation during the run.

Figure 2:
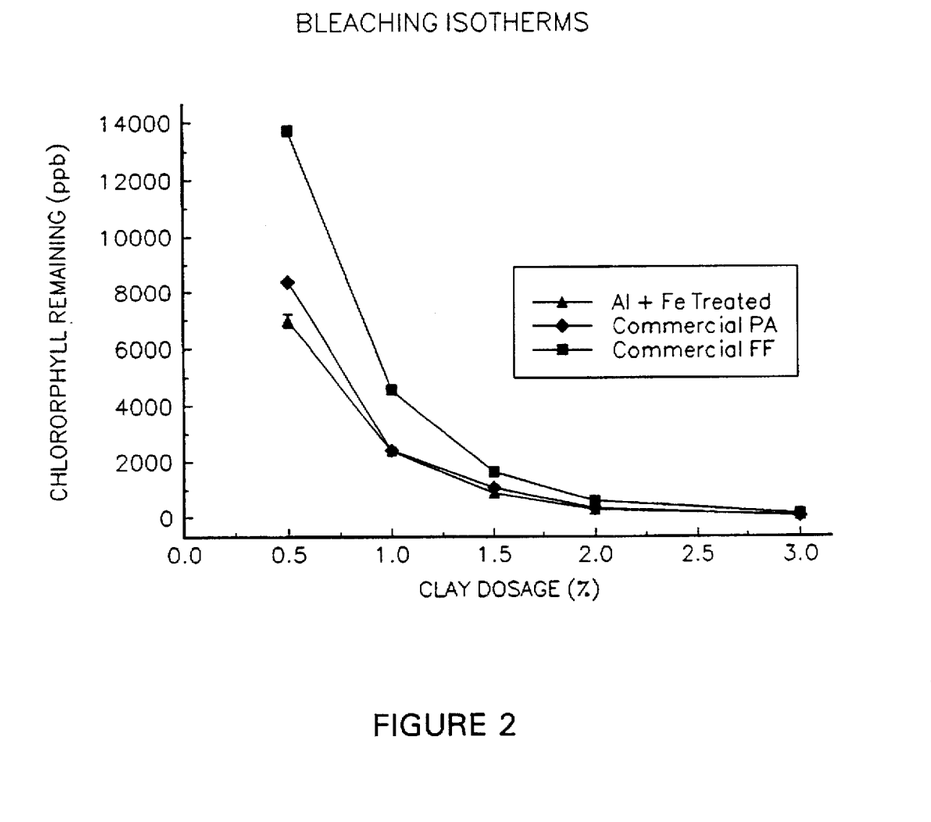
FIG. 2 shows bleaching isotherms comparing the clay composition of the present invention and two commercially available bleaching clays.

The samples were tested for bleaching activity with canola oil. The conditions were: 100 g oil containing 26,000 ppb chlorophyll was bleached for 30 minutes under vacuum at 127 degrees C. FIG. 2 compares the results obtained with the present invention (mean ± standard error of the mean, N=5) to those obtained with two commercially available bleaching clays, PURE-FLO PRO-ACTIVE (Lot PA 4343EE), and OPTIMUM FF. The adsorption isotherm for the present invention was at or below those for the commercial products.

Product Stability

Figure 3:
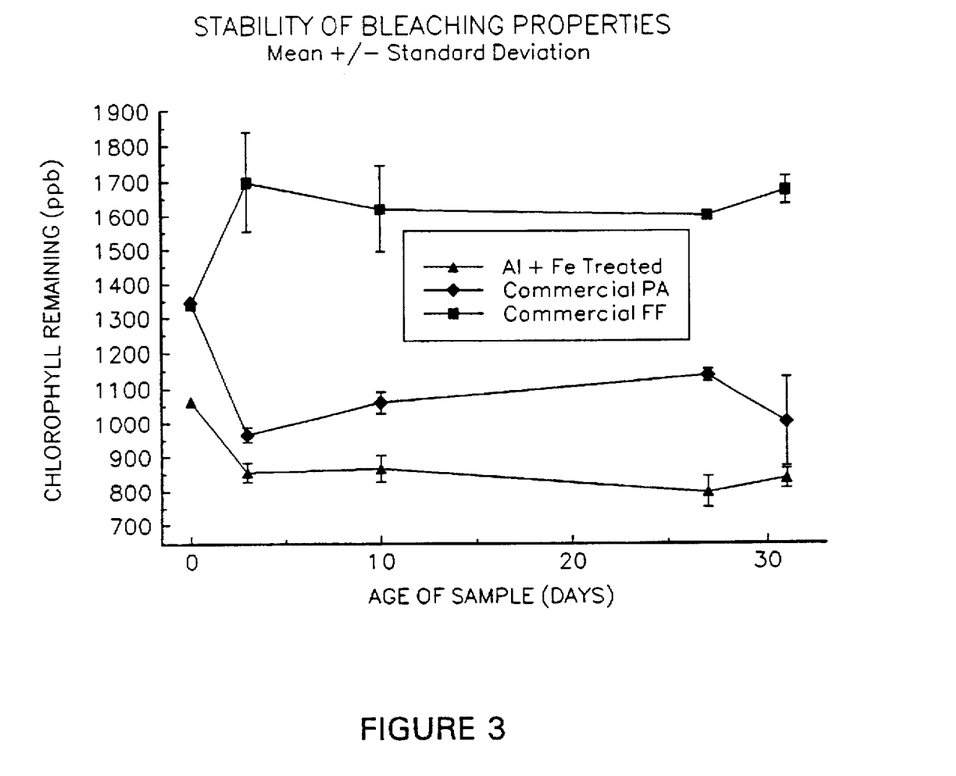
FIG. 3 shows the results of a study in which the stability of the clay composition of the present invention and two commercially available bleaching clays were compared.

No changes in activity have been detected during the first two weeks. FIG. 3 shows the averaged bleaching results of five selected samples, collected during the same production run. The chlorophyll removal results for the clay activated by Lewis acid metal salts are better than those of acid activated clays initially. The clay activated by Lewis acid metal salts retains its superior bleaching properties for the duration test.

This invention has been described in terms of specific embodiments set forth in detail. It should be understood, however, that these embodiments are presented by way of illustration only, and that the invention is not necessarily limited thereto. Modifications and variations within the spirit and scope of the claims that follow will be readily apparent from this disclosure, as those skilled in the art will appreciate.

We claim:

1. A method for producing a bleaching clay which comprises combining an attapulgite-smectite mixture with a metal salt that is a Lewis acid in an amount sufficient to increase the amount of available surface acid sites present in the attapulgite-smectite mixture.

2. The method in accordance with claim 1 comprising the additional step of drying the bleaching clay to a free moisture content of no more than about 35 weight percent.

3. The method in accordance with claim 1 wherein said Lewis acid provides cations having an ionic potential greater than 2.5.

4. A bleaching clay produced in accordance with the method of claim 1.

5. The method of claim 1 wherein the bleaching clay is dried to a free moisture content of no more than about 20 weight percent.

6. The method of claim 1 wherein the bleaching clay is dried to a free moisture content of no more than about 10 weight percent.

7. A method for producing a bleaching clay which comprises combining a smectite-opal mixture with a metal salt that is a Lewis acid in an amount sufficient to increase the amount of available surface acid sites present in the smectite-opal.

8. A bleaching clay produced in accordance with claim 7.

9. A method for producing a bleaching clay which comprises combining a clay mineral of hormite group with titanium sulfate in an amount sufficient to increase the amount of available surface acid sites present in the clay mineral.

10. A method for producing a bleaching clay which comprises combining a clay mineral of hormite group with ferrous sulfate in an amount sufficient to increase the amount of available surface acid sites present in the clay mineral.

11. A method for producing a bleaching clay which comprises combining a clay mineral with a mixture of Lewis acid metal salts that includes aluminum sulfate, ferrous sulfate, and titanium sulfate, the mixture being present in an amount sufficient to enhance surface acid sites present in the clay mineral.

12. The method in accordance with claim 11 wherein said mixture provides provide cations having an ionic potential greater than 2.5.

13. A bleaching clay produced in accordance with the method of claim 11.

14. A method for producing a bleaching clay which comprises combining a clay mineral with a mixture of Lewis acid metal salts that includes aluminum sulfate and ferrous sulfate, the mixture being present in an amount sufficient to enhance surface acid sites present in the clay mineral.

15. A bleaching clay produced in accordance with the method of claim 14.

16. A method for producing a bleaching clay which comprises combining a clay mineral with a mixture of Lewis acid metal salts that includes aluminum sulfate, ferrous sulfate, and titanium sulfate, as well as sulfuric acid, the mixture being present in an amount sufficient to enhance surface acid sites present in the clay mineral.

17. A bleaching clay produced in accordance with the method of claim 16.

* * * * *

UNITED STATES PATENT AND TRADEMARK OFFICE
CERTIFICATE OF CORRECTION

PATENT NO. : 5,749,955
DATED : May 12, 1998
INVENTOR(S) : Dov Shaked et al.

It is certified that error appears in the above-indentified patent and that said Letters Patent is hereby corrected as shown below:

Col. 4, line 46, "$La^{2+}$" should be -- $La^{3+}$ --.

Col. 5, line 19, "$Ti^{44+}$" should be -- $Ti^{4+}$ --.

Col. 7, line 20, "$H_2S_4$" should be -- $H_2SO_4$ --.

Col. 7, line 43, "Reamining" should be -- Remaining --.

Col. 14, line 8, after "provides" delete "provide".

Signed and Sealed this

Twenty-ninth Day of September, 1998

Attest:

BRUCE LEHMAN

Attesting Officer

Commissioner of Patents and Trademarks